[117.]
WASHINGTON WHITNEY.
Improvement in Clothes Wringers.
No. 4,570. Reissued Sep. 26, 1871.
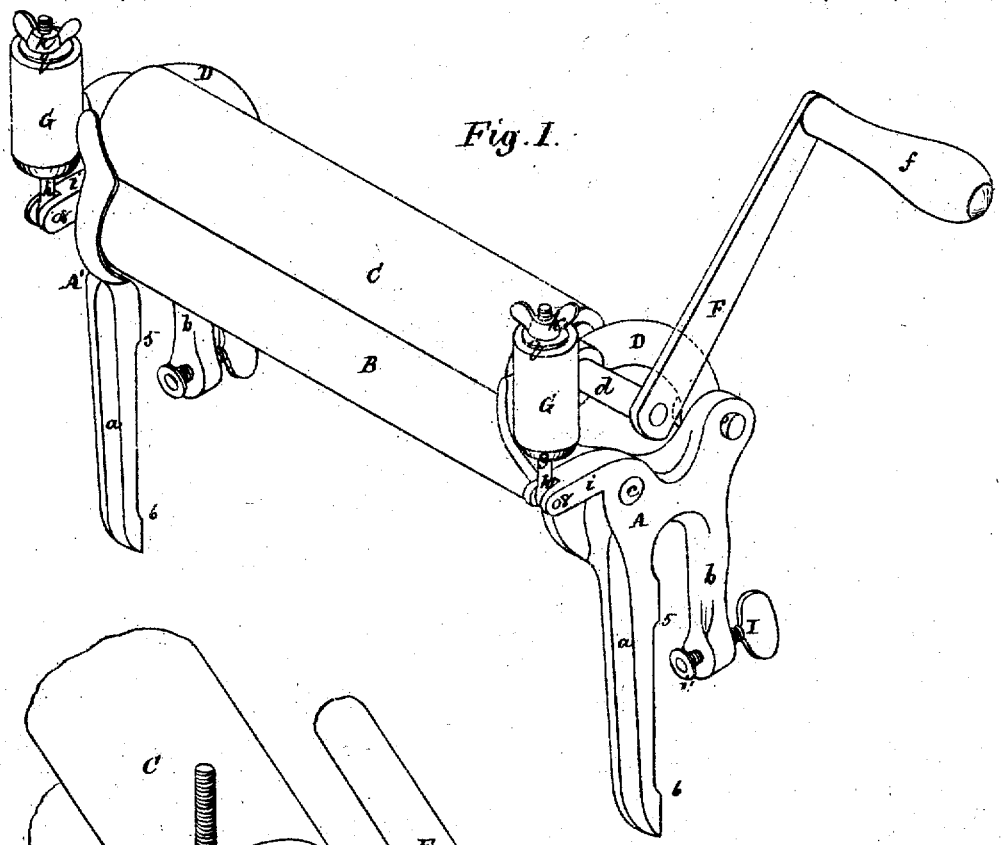
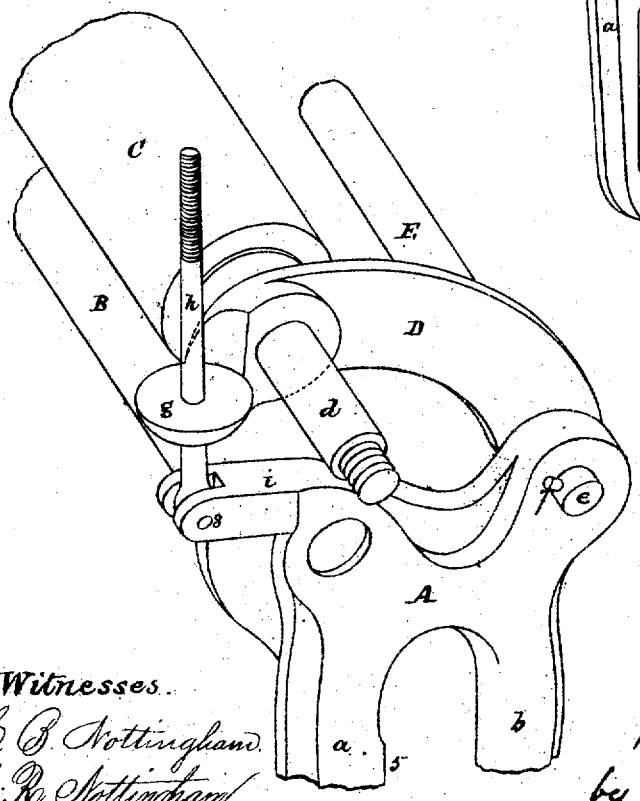
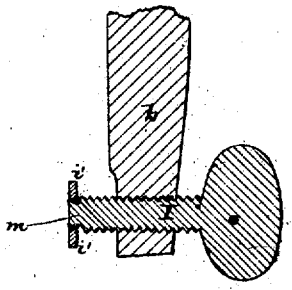
Witnesses.
C. B. Nottingham.
J. R. Nottingham
Inventor.
Washington Whitney
by A. Pollok
his attorney

UNITED STATES PATENT OFFICE.

WASHINGTON WHITNEY, OF WINCHENDON, MASSACHUSETTS, ASSIGNOR TO THE METROPOLITAN WASHING-MACHINE COMPANY.

IMPROVEMENT IN CLOTHES-WRINGERS.

Specification forming part of Letters Patent No. 33,861, dated December 3, 1861; Reissue No. 4,570, dated September 26, 1871.

*To all whom it may concern:*

Be it known that I, WASHINGTON WHITNEY, formerly of Baldwinsville, Massachusetts, now of Winchendon, in the county of Worcester and State of Massachusetts, have invented certain new and useful Improvements in Clothes-Wringers, of which the following is a specification:

My invention relates, first, to the devices which are used to clamp or hold the wringer on the tub or other article to which it may be applied; secondly, to the construction of the roll-supporting frame; and thirdly, to the arrangement of the wringing-rolls and their springs. My object in the first portion of my invention is to allow the clamping devices to adjust themselves to the curvature of the tub and to enable them to take a firm hold upon the tub. To this end my invention consists in the combination of a yoke connected with or forming part of the wringer-frame, and adapted to fit over the edge of the tub, with a clamping-screw carried by one of the legs of the yoke, and a self-adjusting pad on the end of the screw which will adapt itself to the curvature of the sides of the tub, substantially as hereinafter shown and described. It also consists in the formation of two bearings or projections upon the inner side of one of the legs of the yoke, in combination with a clamping device carried by the other leg under such an arrangement that the said device shall bear upon the portion of the tub straddled by the legs at a point intermediate between those at which the projections bear upon the same, for the purpose of taking a firmer hold upon the tub. The object of the next portion of my invention is to simplify the construction of the frame and to combine it more solidly and permanently with the clamping devices; and to this end the invention consists of a clothes-wringer provided at each end with a roll-supporting metallic frame cast in one piece with a pair of legs or yoke adapted to straddle the edge of the tub, one of the legs of each pair being provided with a clamping-screw or the equivalent thereof, substantially as hereinafter shown and described. The main object of the next portion of my invention is to allow a considerable up-and-down motion to the upper wringer-roll without the necessity of a cumbrous framework above said roll to contain the springs which hold it down; and to this end the invention consists in the combination of brackets hinged to the frame and carrying the upper roll, with springs hinged or pivoted at one end to the frame, and connected with the brackets so as to draw the upper roll down upon the lower, as hereinafter described.

In the accompanying drawing I have represented a machine in which the foregoing features are embodied, and this I will now proceed to describe in order that others may understand the manner in which my invention is or may be carried into effect.

Figure 1 is a perspective view of the machine. Fig. 2 is a like view of a portion of the machine on an enlarged scale, with one of the springs removed in order to show the manner in which connection is made between it and the upper roll or the bracket carrying the same. Fig. 3 is a vertical section through one leg of one of the yokes or pairs of legs which serve to hold the wringer to the tub, showing the arrangement of the clamping-screw and self-adjusting pad.

A A′ are two metallic end frames which support the rolls. The legs *a b* of these frames form yokes which fit over the edge of the tub to which the machine is applied, and I prefer to cast them in one piece with the frames. A thumb or clamping screw, I, in each leg *b* serves to draw the leg *a* against the sides of the tub, thus clamping and fastening the wringer in place, and on the end of each clamping-screw I place a pad, *i′*, arranged to have a tilting motion of its own in all directions, so that it may adjust itself to the curvature or inclination of the side of the tub against which it is pressed, thus preventing one of its edges being forced in advance of the other against the side of the tub, which would in such case be indented or otherwise defaced, and enabling it to take a square bearing upon the tub so as to hold the wringer much more firmly than would otherwise be the case. This union of the pad and screw is effected, in the present instance, in a very simple manner by forming on the end of the screw a cylindrical neck, *m*, upon which the pad loosely fits, as shown in Fig. 3, the extreme end of the screw being slightly upset in order to prevent the pad from coming off. To permit the clamping devices to take a firmer hold on the tub I cast on the inner side of each of the legs *a* projections 5 and 6, which are the only portions of the leg brought in contact with the tub, and the screw on the other leg is so arranged that the pad will take its bearing on the other side of the tub at a point intermediate between the two parts 5 6 of the opposite leg *a*. The shaft of the lower roll B has its bearings at *c* in the two end frames, and the shaft *d* of the upper roll C has its bearings in two stout brackets, D, the other ends of which are pivoted at *e* to the end frames A A'. The pivot on which these brackets D are hung is a coupling-rod or brace, E, which couples the two end frames together. The rod is turned down, forming a shoulder at each end just inside of the brackets D, and passes through the two end frames, and has a pin, 7, driven through each of its ends. A crank, F, and handle *f* are attached to the end of the shaft *d*, which is prolonged to a convenient length. (The drawing shows the shaft *d* shorter than I generally make it.) To the outer end of each bracket D is attached a disk, *g*, with a hole through its center, through which plays a rod, *h*, the lower end of which is hinged at 8 to a short arm, *i*, projecting from the end frame A. A cylindrical india-rubber spring, G, is slipped over the rod *h* and rests on the disk *g*. A washer, *q*, is placed over the spring, and a thumb-screw, *k*, which screws onto the end of the rod, *h*, serves to compress the spring and regulate the pressure of the rolls B and C. There is a similar arrangement of rod and spring at the other end of the machine. The rolls B and C are covered with vulcanized india-rubber in a manner common to many of these machines. As the articles to be squeezed are passed between the rolls B and C the latter roll rises against the resistance of the springs G, the brackets D vibrating on their pivots *e*. As the brackets move it is necessary that the rods *h* should also vibrate on their pivots 8 to permit the springs G to follow the motions of the brackets.

What I claim as my invention is as follows:

1. The combination, in a clothes-wringing machine, of a yoke adapted to straddle or fit over the edge of the tub to which the machine is applied, with a clamping-screw carried by one of the legs of the yoke, and a self-adjusting pad on the end of the screw which will adapt itself to the curvature or inclination of the side of the tub, substantially as shown and described.

2. The projections formed upon one of the legs of the yoke, in combination with a clamping device carried by the other leg, under such an arrangement that the clamping device shall bear upon one side of the tub to which the wringer is applied at a point intermediate between those at which the projections bear upon the opposite side of the same, substantially as shown and described.

3. A clothes-wringer provided at each end with a roll-supporting metallic frame cast in one piece with a yoke or pair of legs for straddling the edge of the tub to which the wringer is applied, one of the legs of each pair being provided with a clamping device, substantially as described.

4. The combination of the lower roll and its supporting-frames with the upper roll carried in brackets hinged to the frames, and the springs connected with the frames and brackets so as to draw together the rolls, substantially in the manner shown and set forth.

In testimony whereof I have hereunto signed my name in the presence of two subscribing witnesses.

WASHINGTON WHITNEY.

Witnesses:

E. S. WOOD.

F. B. SPALTER.